April 19, 1938.     E. F. ENGSTROM     2,114,918

SPRING

Filed June 15, 1936     2 Sheets-Sheet 1

Ernst F. Engstrom
INVENTOR

BY Victor J. Evans & Co.
ATTORNEYS

April 19, 1938. E. F. ENGSTROM 2,114,918
SPRING
Filed June 15, 1936 2 Sheets-Sheet 2
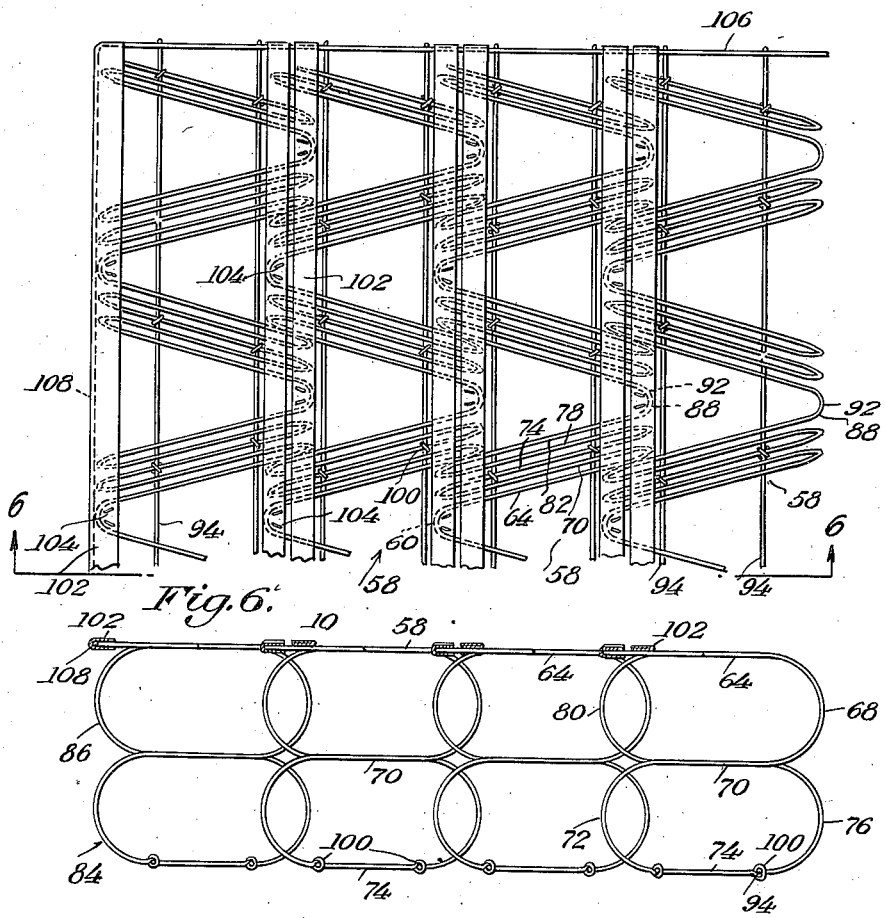
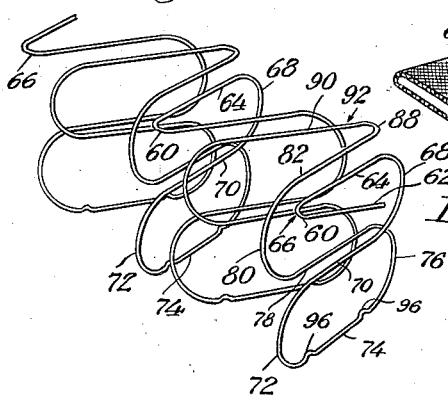
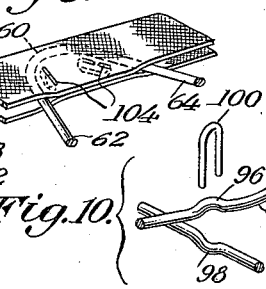
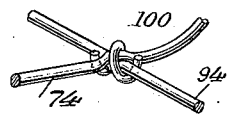
Ernst F. Engstrom
INVENTOR
BY Victor J. Evans & Co.
ATTORNEYS Patented Apr. 19, 1938

2,114,918

UNITED STATES PATENT OFFICE 2,114,918

SPRING

Ernst F. Engstrom, Maywood, Ill.

Application June 15, 1936, Serial No. 85,403

4 Claims. (Cl. 5—247)

My invention relates to furniture, and has among its objects and advantages the provision of an improved spring. The spring structure is also applicable to vehicles.

In the accompanying drawings:

Fig. 5 is a plan view of a different spring;

Fig. 6 is a view taken from the position indicated by line 6—6 of Fig. 5;

Fig. 7 is a diagrammatic perspective view of a portion of the spring structure;

Fig. 8 is a perspective view of a portion of the interconnecting means for the spring units;

Fig. 9 is a perspective view of an additional interconnecting means; and

Fig. 10 is a perspective view illustrating the parts shown in Fig. 9 in separated relation.

In the embodiment selected to illustrate my invention, I make use of a plurality of spring units 10 which are assembled in operative relation to provide the spring structure. These units are identical in construction, each unit being formed of a single wire. The units may be made up in any desired length, and the lengths may be cut to provide units of the desired proportion.

Figure 3:
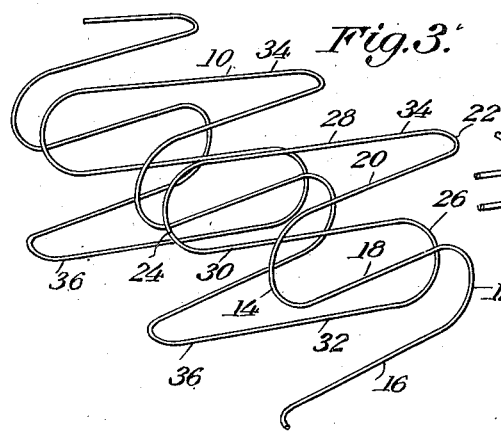
Fig. 3 is a diagrammatic perspective view of a part of the spring structure.

In Fig. 3, I illustrate the manner in which the wire is shaped to provide one of the units 10. The wire is bent at 12 and 14 to provide three reaches 16, 18, and 20. These reaches are spaced apart and take the shape of an S. The reaches 16, 18, and 20 lie in a common plane. The wire is bent again at 22, 24, and 26, to provide reaches 28, 30, and 32. The reaches 28, 30, and 32 lie in a common vertical plane, which plane is arranged at an acute angle to the vertical plane of the reaches 16, 18, and 20. The reaches 20 and 28 lie in a common horizontal plane, which is also true of the reaches 16 and 32. Obviously, the wire may be bent in the above described manner to provide a spring unit of any desired length.

Figure 1:
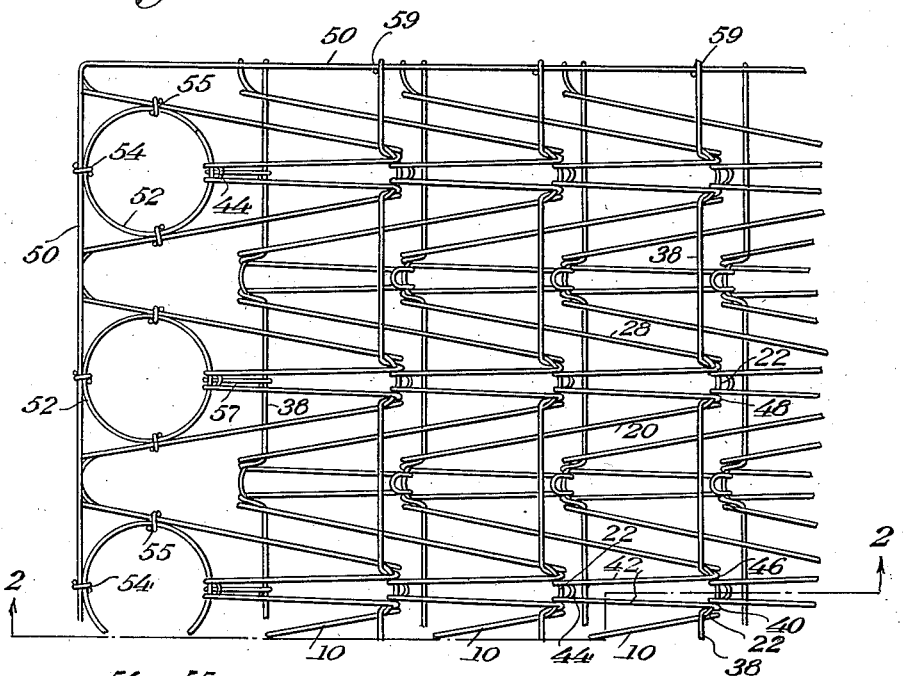
Fig. 1 is a plan view of a portion of the spring.
Figure 2:
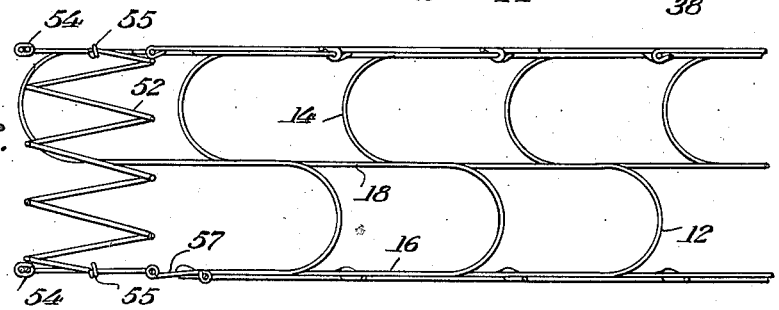
Fig. 2 is a sectional view along the line 2—2 of Fig. 1.

In shaping the wire according to Fig. 3, the spring unit is made up of a plurality of upper V-shaped elements 34 and a plurality of lower V-shaped elements 36. Both sides of the spring unit are identical and either may be employed for load carrying purposes. The spring units 10 may be assembled in various spaced relation. In Fig. 1, I illustrate the units 10 as being arranged in such close relation that the elements 34 and 36 are nested within one another.

Figure 4:
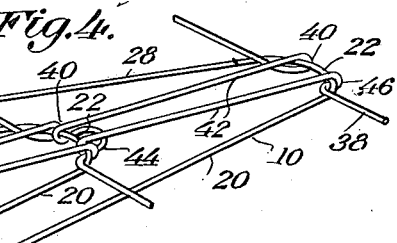
Fig. 4 is a perspective view illustrating the interconnecting means for spring units.

After assembly, the units 10 are interconnected into a unitary structure. One wire interconnects two spring units 10 throughout the full width of the spring assembly. Referring to Figs. 1 and 4, the wire 38 is bent around the curvature 22 at 40, and shaped to provide two reaches 42 bent to provide a hook 44 which hooks over the bend 22 of the adjacent unit 10. The wire is then bent a second time around the first bend 22, as indicated at 46, and is then extended to the next bend 22 and wrapped thereabout as indicated at 48. Such bending continues throughout the full width of the spring assembly. The bends 40 and 46 are spaced apart sufficiently far to receive the hook 44 of an adjacent tie wire. These hooks may be bent into close relation with the reaches 42 to prevent disconnection. The tie wires are so arranged as to not impair the flexibility of the spring units 10, but the units 10 are effectively held in assembled relation.

I provide tie wires for both upper and lower elements 34 and 36. Both sides of the spring assembly are identical in construction. In Fig. 1, I indicate one of the spring units 10 along one edge of the spring assembly as being provided with a plurality of coil springs 52. The upper ends of the coil springs are connected with the wire 50 by means of wire loops 54. Wire loops 55 connect the upper and lower ends of the coil springs with the reaches 20 and 28, and 16 and 32, respectively. The hooks 44 associated with one of the tie wires are connected with the upper ends of the coil springs while wire 57 connects the lower ends of the coil springs with the tie wire 38 associated with the unit 10 at its bottom. The spring unit 10 at the opposite side of the spring assembly may be provided with coil springs 52 in the same way as the unit 10 illustrated in Fig. 1. The ends of the tie wires 38 are wrapped about the wire 50 as indicated at 59.

My coil springs 52 assist the two spring units 10 at the opposite side of the spring assembly to support the necessary load. The units 10 within the spring assembly have a greater load bearing capacity than the two units 10 provided with the coil springs, because of the nested relation of the units.

My construction permits a large spring surface to be made up of relatively few spring units. The horizontal elements 34 and 36 comprise load carrying parts, while the bends 12 and 14 lend flexibility to the spring units. The flexibility of the spring assembly as a whole may be changed by varying the spacing of the spring units 10.

In addition to holding the spring units 10 in assembled relation, the tie wires tend to distribute load forces evenly over adjacent spring units. By closely nesting the elements 34 and 36, a dense spring composition is attained, thereby increasing the comfort of the spring structure as well as providing an effective surface for supporting padding and the like.

In Figs. 5 to 10, inclusive, I illustrate a different construction, one of which the wire making up the individual spring units 58 is bent at 60 to provide angular reaches 62 and 64 lying in a horizontal plane. The reaches 62 and 64 define a V-shaped element 66 corresponding to the elements 34 and 36.

The reach 64 is bent at 68 to provide a horizontal reach 70 bent at 72 to provide a second horizontal reach 74. The reaches 64, 70 and 74 lie in a common vertical plane. I bend the reach 74 at 76 to provide a horizontal reach 78 bent at 80 to provide a horizontal reach 82. When viewed endwise, the spring unit of Fig. 7 takes the appearance of two flattened loops as illustrated at 84 and 86 in Fig. 6. Reach 82 is bent at 88 to provide a horizontal reach 90. Thus, the reaches 82 and 90 define a V-shaped element 92 corresponding to the element 66, but pointing in the opposite direction. The two elements lie in a common horizontal plane. The reaches 64, 70, and 74 lie in a plane at a slight angle to the vertical which is also true of the reaches 78 and 82.

Stringers 94 may be connected with the reaches 74. These reaches are bent at 96 for partly embracing the stringers. Similarly, the stringers are bent as at 98 for partly embracing the reaches. The bends 96 and 98 are arranged in crossed relation, as indicated in Fig. 9, and firmly secured together by a clip 100 which is bent around the crossed wires, as indicated in Fig. 9. The stringers 94 are provided across the lower surface of the spring assembly.

The angular relation between the reaches 62 and 64 and 82 and 90 provides an arrangement in which the spring units 58 may be closely nested as illustrated in Fig. 5. The free ends of the elements 66 are interconnected by a tape or fabric member 102 (see Fig. 8). This member is folded back upon itself and connected with the element by staples 104.

The free ends of the elements 92 are connected in the same way. Thus, the members 102 extend the full width of the spring and are connected with a wire 106 defining the perimeter of the spring in the same manner as the wire 50. The reach 108 of the wire 106 is enclosed within one of the tie members 102.

Without further elaboration, the foregoing will so fully explain my invention that others may, by applying current knowledge, readily adapt the same for use under various conditions of service.

I claim:

1. In a spring of the type described, a spring unit comprising a single piece of wire shaped to provide a plurality of horizontal V-shaped elements, and a plurality of S-shaped elements lying in vertical planes, the V-shaped elements comprising portions of the S-shaped elements.

2. In a spring of the type described, a spring unit comprising a single piece of wire shaped to provide a plurality of V-shaped elements lying in upper and lower horizontal planes, and a plurality of S-shaped elements lying in vertical planes, the V-shaped elements comprising portions of the S-shaped elements.

3. In a spring of the type described, a spring unit comprising a single piece of wire shaped to provide a plurality of V-shaped elements lying in a horizontal plane, and a plurality of S-shaped elements lying in vertical planes, the V-shaped elements comprising portions of the S-shaped elements, said S-shaped elements being grouped in pairs with one S reversed with respect to the other S in that pair.

4. In a spring of the type described, a spring unit comprising a single piece of wire shaped to provide a plurality of horizontal load supporting elements, and a plurality of S-shaped elements lying in vertical planes, the horizontal load supporting elements comprising portions of the S-shaped elements, said S-shaped elements being connected to each other through said horizontal load supporting elements, and lying in a plurality of vertical planes.

ERNST F. ENGSTROM.